(12) United States Patent
Fioravanti (10) Patent No.: US 6,466,392 B1
(45) Date of Patent: Oct. 15, 2002

(54) HEAD FLIGHT CHARACTERIZATION USING A NON-CONTACT VOLTMETER

(75) Inventor: Louis J. Fioravanti, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/396,099

(22) Filed: Sep. 14, 1999

Related U.S. Application Data
(60) Provisional application No. 60/100,189, filed on Sep. 14, 1998.

(51) Int. Cl.[7] ................................................ G11B 21/02
(52) U.S. Cl. ....................................... 360/75; 360/77.03
(58) Field of Search ........................ 360/31, 75, 78.04; 73/12.09, 765; 369/53, 44.23, 44.24, 126, 112.24; 356/492; 29/603.03

(56) References Cited

U.S. PATENT DOCUMENTS

| | | |
|---|---|---|
| 4,416,144 A | 11/1983 | Chen et al. |
| 4,724,392 A | 2/1988 | Bandara et al. |
| 4,872,071 A | 10/1989 | Easton et al. |
| 4,931,887 A * | 6/1990 | Hegde et al. ................. 360/75 |
| 5,136,250 A * | 8/1992 | Abdelli ........................ 324/661 |
| 5,818,592 A * | 10/1998 | Womack et al. ............ 356/357 |
| 5,859,358 A * | 1/1999 | Wood et al. ..................... 73/9 |
| 5,995,335 A * | 11/1999 | Jurgenson et al. .......... 360/290 |

FOREIGN PATENT DOCUMENTS

JP           62-132283 A        6/1987

* cited by examiner

Primary Examiner—David Hudspeth
Assistant Examiner—K. Wong
(74) Attorney, Agent, or Firm—Fellers, Snider, et al.

(57) ABSTRACT

A method for evaluating head flight characteristics in a disc drive includes placing a non-contact voltmeter (NCV) probe into close proximity to a disc, the probe sensing disc potential in relation to a quantity of electrical charge present on the disc. The disc is accelerated with the head initially remaining in contact with the disc, and the disc potential is monitored until a rotational velocity is achieved sufficient to cause the head to separate from the disc. A head take off velocity is thereafter determined in relation to a detected change in the measured disc potential. A head touchdown velocity is similarly determined by initially accelerating the disc to separate the head therefrom, and then monitoring the disc potential as the disc is decelerated to bring the head back into contact with the disc.

14 Claims, 5 Drawing Sheets

HEAD FLIGHT CHARACTERIZATION USING A NON-CONTACT VOLTMETER

RELATED APPLICATIONS

This application claims the benefit of Provisional Application No. 60/100,189 filed Sep. 14, 1998.

FIELD OF THE INVENTION

This invention relates generally to the field of disc drive storage devices, and more particularly, but not by way of limitation, to improvements in the detection of head flight characteristics in a disc drive.

BACKGROUND OF THE INVENTION

Disc drives are commonly used as the primary data storage and retrieval devices in modern computer systems. In a typical disc drive, user data are magnetically stored on one or more discs that are rotated at a constant high speed and accessed by a rotary actuator assembly having a plurality of read/write heads that fly adjacent the surfaces of the discs.

When the disc drive is deactivated, the heads are typically moved from an aerodynamically supported position over data recording portions of the discs and brought to rest onto texturized landing zone portions of the discs. More particularly, the heads are said to "touchdown" onto the landing zones as the disc rotational velocity decreases to a level just insufficient to continue to aerodynamically support the heads. Once the heads are located over the landing zones, a latch secures the actuator assembly to prevent inadvertent movement of the heads out onto the data recording portions of the disc as a result of a mechanical shock to the deactivated disc drive.

Upon subsequent reinitialization of the drive, current is applied to a spindle motor to accelerate the discs to operational velocity and the heads "take off" from the landing zones when the discs reach a take off velocity just sufficient to aerodynamically support the heads. The actuator assembly is thereafter unlatched and the heads are moved out over the data recording portions for normal disc drive operation.

It is desirable for a variety of reasons to determine with some precision the respective disc velocities at which the heads take off and touchdown. Heads are typically mounted on "slider" assemblies which provide the requisite aerodynamic features that enable the heads to fly above the disc surfaces; hence, head take off and touchdown information is useful in evaluating the performance of various alternative slider designs. Moreover, since disc drives typically use the spindle motors as generators when power is removed from the drives and use this derived power to quickly move the heads to a latched position over the landing zones before the discs come to rest, information regarding head take off and touchdown characteristics is invaluable in configuring the deinitialization operation of new drive designs. Another area where head flight characteristic information is useful is during extended reliability testing where a population of drives is operated over a long period of time to observe changes in operational performance, as disc wear and subsequent disc drive life are typically strongly correlated to the amount of time that the heads spend in contact with the rotating discs before take off and after touchdown.

One prior art approach to determining head take off and touchdown information involves the use of an acoustic emissions (AE) sensor which basically comprises a tiny microphone (transducer) that is bonded to the actuator assembly near the heads. Since a great deal of audible noise is generated as the heads drag along the discs (before take off and after touchdown), and this noise is removed when the heads subsequently separate from the discs, the AE sensor has been used to detect this change in acoustic output and correlate this change to the rotational velocity of the discs.

While operable, this and other similar prior art approaches have suffered from various drawbacks. Insertion of an AE sensor requires that the protective housing surrounding the discs and heads be opened, both allowing for the introduction of contaminants into the housing as well as altering the mechanical configuration of the disc drive. Moreover, using an adhesive to bond the extraneous sensor to the actuator assembly contaminates the drive, making this a destructive test unsuitable for normal manufacturing processes.

Accordingly, there is a need for improvements in the art to enable disc drive manufacturers to evaluate head flight characteristics in a substantially noninvasive and easily implementable manner. It is to such improvements that the present invention is directed.

SUMMARY OF THE INVENTION

The present invention is directed to a method for evaluating head flight characteristics in a disc drive.

In accordance with preferred embodiments, a methodology is presented to identify a head take off velocity, which is a velocity just sufficient to aerodynamically support a head above a rotatable disc.

A non-contact voltmeter (NCV) probe is initially brought into close proximity to the disc to form an air gap therebetween, the probe sensing disc potential in relation to a quantity of electrical charge present on the disc. The disc is accelerated with the head initially remaining in contact with the disc, and the disc potential is monitored until a rotational velocity is achieved sufficient to cause the head to separate from the disc and remain aerodynamically supported over the disc. The head take off velocity is thereafter determined in relation to a detected change in the measured disc potential.

A methodology is further provided to determine a head touchdown velocity, which is a velocity at which the head is no longer aerodynamically supportable and comes into contact with the disc. As before, a NCV probe is brought into close proximity to the disc to sense disc potential in relation to a quantity of electrical charge present on the disc.

The disc is accelerated to an initial rotational velocity sufficient to aerodynamically support the head over the disc at a nominal flying height, after which the disc is decelerated to cause the head to come into contact with the disc. The head touchdown velocity is identified in relation to a detected change in the disc potential.

With knowledge of the head take off and touchdown velocities, the distance (in disc revolutions) that the head remains in contact with the disc before take off and after touchdown can be determined.

These and various other features as well as advantages which characterize the present invention will be apparent from a reading of the following detailed description and a review of the associated drawings.

BRIEF DESCRIPTION OF THE DRAWINGS

FIG. 6 is a flow chart for a HEAD TOUCHDOWN VELOCITY DETECTION routine, illustrative of steps carried out in accordance with preferred embodiments of the present invention.

DETAILED DESCRIPTION

Figure 1:
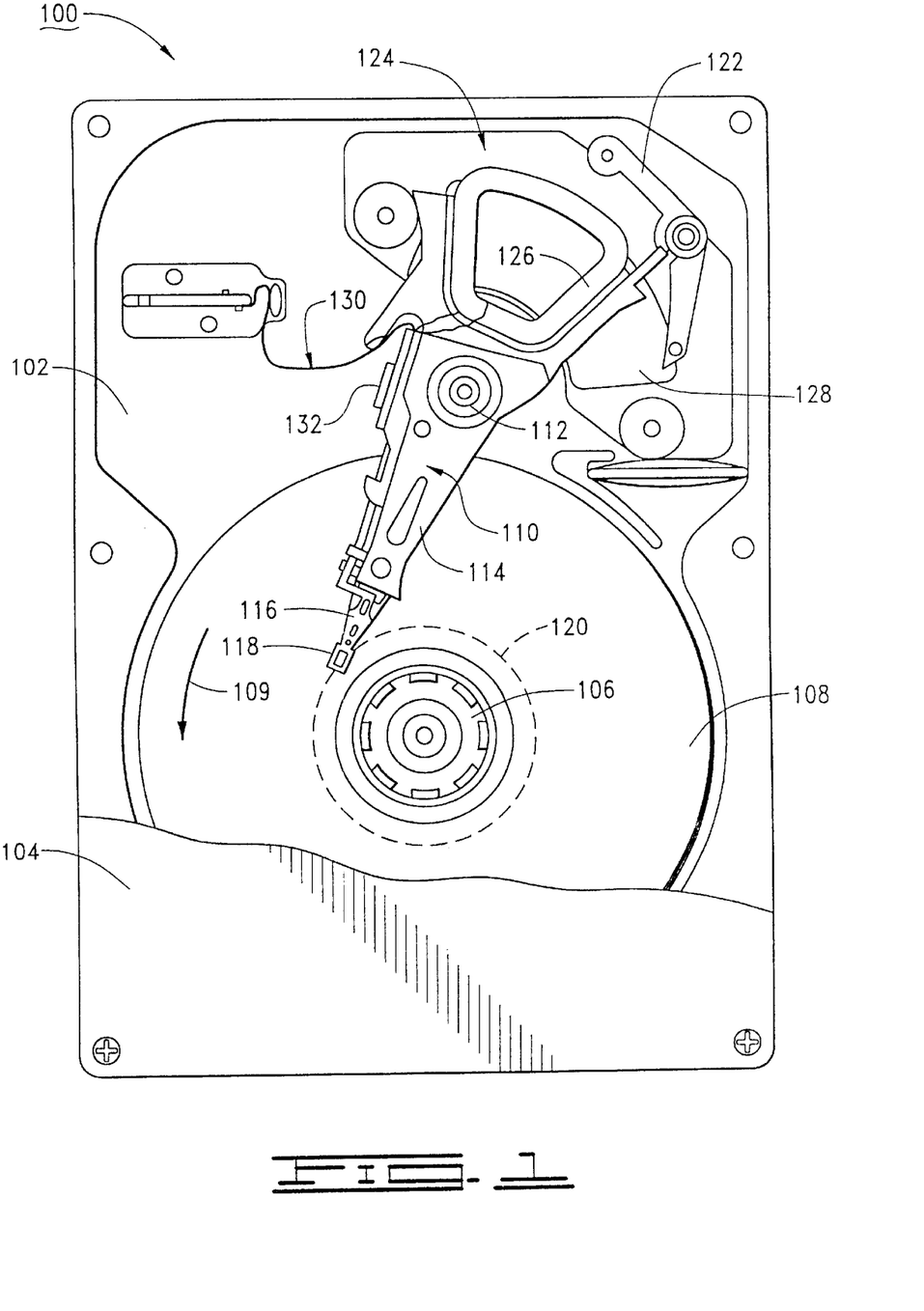
FIG. 1 shows a top plan view of a disc drive in which preferred embodiments of the present invention can be readily practiced.

In order to provide a detailed description of various preferred embodiments of the present invention, reference is first made to FIG. 1, which provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant velocity (in thousands of revolutions per minute) as indicated by vector 109. User data are written to and read from tracks (not designated) on the discs 108 through the use of an actuator assembly 110, which rotates about a bearing shaft assembly 112 positioned adjacent the discs 108.

The actuator assembly 110 includes a plurality of rigid actuator arms 114 which extend toward the discs 108, with flexible suspension assemblies 116 (flexures) extending therefrom. Mounted at the distal end of each of the flexures 116 is a head 118 which includes a slider assembly (not separately designated) designed to fly in close proximity to the corresponding surface of the associated disc 108. The heads 118 are preferably characterized as magneto-resistive (MR) heads each having a thin-film inductive write element and an MR read element.

When the disc drive 100 is not in use, the heads 118 are moved over and come to rest upon landing zones 120 near the inner diameter of the discs 108 and the actuator assembly 110 is secured using a magnetic latch assembly 122. Such operation will be discussed in greater detail below.

The radial position of the heads 118 is controlled through the use of a voice coil motor (VCM) 124, which includes a coil 126 attached to the actuator assembly 110 as well as a permanent magnet 128 which establishes a magnetic field in which the coil 126 is immersed. A second magnetic flux path is disposed above the permanent magnet 128, but has not been shown for purposes of clarity. The heads 118 are moved across the surfaces of the discs 108 through the application of current to the coil 126.

A flex assembly 130 provides the requisite electrical connection paths for the actuator assembly 10 while allowing pivotal movement of the actuator assembly 110 during operation. The flex assembly 130 includes a preamplifier/driver circuit 132 (preamp) which applies write currents to the write elements of the heads 118 during a write operation and applies read bias currents to the MR read elements of the heads 118 during a read operation. The preamp 132 further amplifies readback signals obtained during a read operation and provides the same to disc drive control electronics (not shown) disposed on a disc drive printed circuit board (PCB) attached to the underside of the base deck 102.

Figure 2:
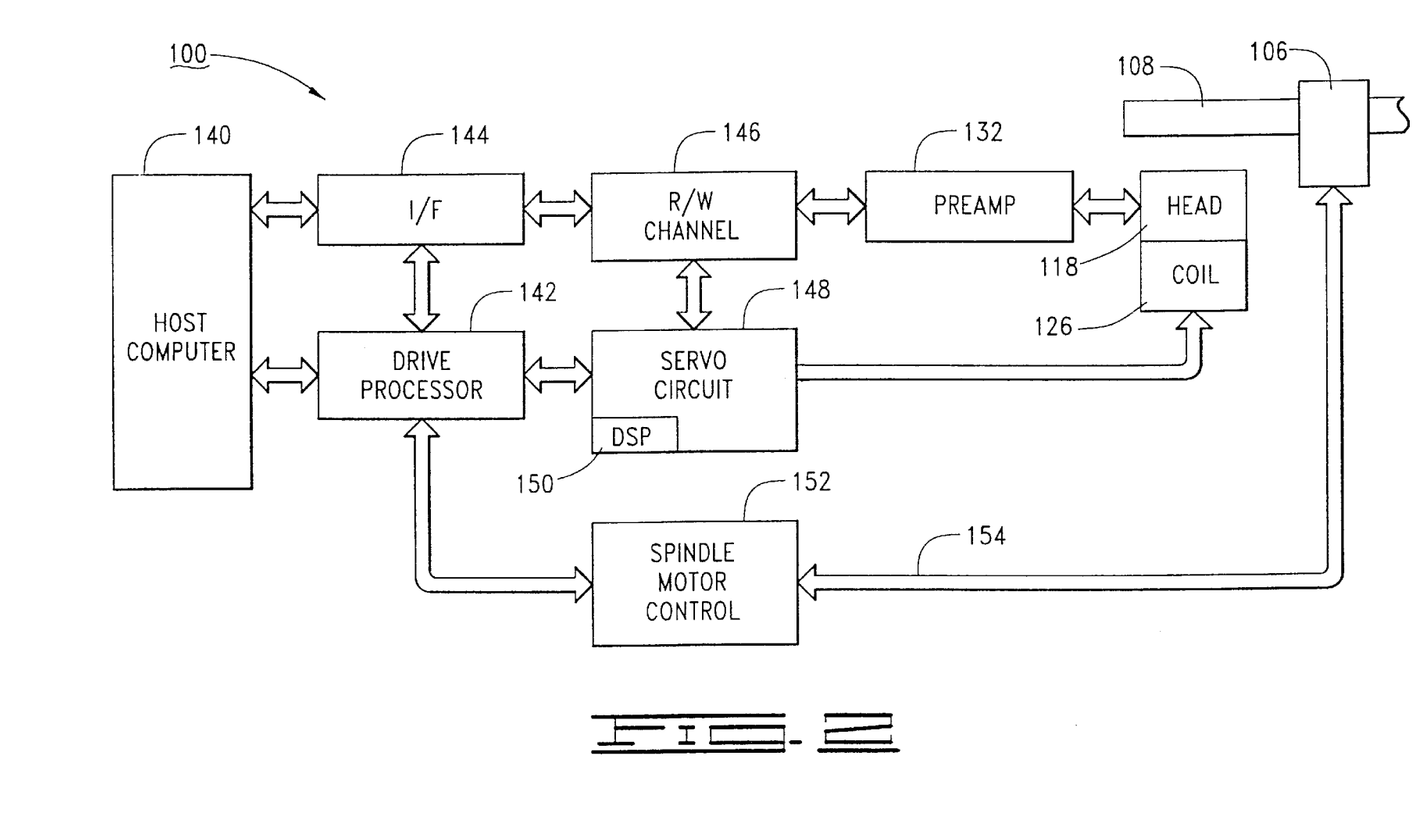
FIG. 2 provides a functional block diagram of the disc drive of FIG. 1 in conjunction with an associated host computer.

FIG. 2 shows a functional block diagram of the disc drive 100 of FIG. 1, in conjunction with an associated host computer 140. At this point it will be noted that the host computer 140 is configured to interface with the disc drive 100 in a conventional fashion, except that the host computer 140 is preferably further equipped with programming to enable a user to carry out the head flight characteristics routines discussed herein as well as a conventional data acquisition card configured to obtain measurements from the disc drive 100.

The disc drive 100 includes a drive processor 142 which carries out top level control functions for the drive. User data to be stored to the discs 108 are passed from the host computer 140 to an interface (I/F) circuit 144 which buffers and sequences the data, a read/write (R/W) channel 146 which encodes and serializes the data, and the preamp 132, which applies a series of alternating write currents to a write element of the head 118 in order to selectively magnetize the disc 108. During a read operation, the preamp 132 applies a read bias current to a read element of the head 118 and transduces the selective magnetization of the disc 108 in relation to changes in voltage across the read element. This results in readback signals correlated to the originally written data. The readback signals are decoded by the R/W channel 146 and passed via the I/F circuit 144 to the host computer 140.

FIG. 2 further shows a servo circuit 148 which receives readback signals from servo data written to the discs 108 and, in response, applies current to the coil 126 in order to control the position of the heads 118. The servo circuit 148 is shown to be processor-based, in that the circuit includes a digital signal processor (DSP) 150. Finally, FIG. 2 provides a spindle motor control circuit 152 which, in response to commands from the drive processor 142, applies multi-phase currents to the spindle motor 106 to rotate the discs 108. Although the disc drive 100 is designed to nominally operate with the discs 108 rotated at a constant high velocity, it will be appreciated that the drive processor 142 can readily cause the discs 108 to rotate at lower velocities. Moreover, actual measurements of the rotational velocity of the discs can readily be obtained by accessing the appropriate signal lines (functionally represented by path 154) used to supply the drive currents to the spindle motor 106.

Figure 3:
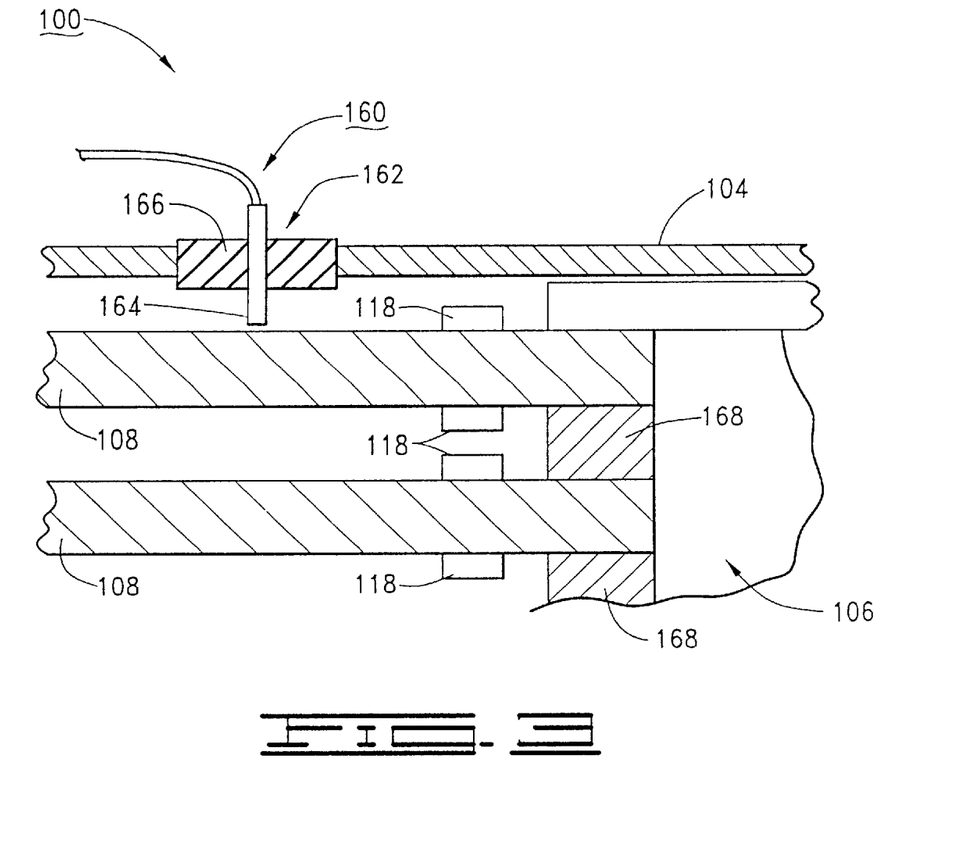
FIG. 3 is a partial cross-sectional, elevational view of the disc drive of FIG. 1, in conjunction with a probe of a non-contact voltmeter inserted through an opening in the disc drive top cover and used to monitor disc potential.

FIG. 3 is a partial cross-sectional, elevational view of a portion of the disc drive 100, illustrating the use of a non-contact voltmeter (NCV) probe 160 of in accordance with preferred embodiments of the present invention. As will be recognized by those skilled in the art, a NCV probe such as 160 is a transducer that provides an analog output signal with a voltage amplitude in relation to sensed electric field strength of an object, which in turn is a function of the amount of electrical charge on the object with respect to a reference level (such as ground). Such probes are commercially available and are readily interfaceable with a corresponding data acquisition card in a host computer (such as the host computer 140 in FIG. 2) to obtain a sequence of digital values corresponding to the voltage measurements from the probe.

Accordingly, the probe 160 is preferably inserted through an opening 162 in the top cover 104 formed for this purpose and secured therein to place a distal end 164 of the probe in close proximity to, without touching, the top disc 108 of the disc drive 100. The opening 162 is preferably formed before attachment of the cover 104 to the base deck 102 to reduce the introduction of contaminants and the possibility of inadvertent damage to the rest of the disc drive 100 as the hole is drilled or cut. The opening 162 is provided with a suitable diameter to accommodate the probe 160, such as about 12.7 millimeters (0.5 inches).

The probe 160 is secured in place using a suitable insulating and sealing material 166, such as a rubber grommet or epoxy. A suitable width is selected for the resulting air gap between the distal end 164 and the top disc 108. The width of the air gap will in large part depend upon the construction of the probe 160. Since field strength is a function of distance, bringing the distal end 164 closer to the top disc 108 will generally provide greater sensitivity in the resulting potential measurements. At the same time, the distal end 164 should be sufficiently removed from the top disc 108 to prevent inadvertent arcing or physical contact between the disc 108 and the distal end 164. In one preferred embodiment the air gap will be about 1.00 millimeter (0.04 inches).

Once the probe 160 is installed, the top cover 104 is thereafter affixed to the base deck 102. In this way, a "test cover" (with the probe 160 installed) can be initially fabricated and then individually mated as required in a clean room environment to any number of production or engineering evaluation drives. This minimizes disturbance to and contamination of the mechanical portions (including the discs 108 and the actuator assembly 110) of such drives.

Continuing with FIG. 3, it will be noted that the disc drive 100 is shown to comprise a plurality of discs 108 (separated by disc spacers 168) and a corresponding plurality of heads 118 adjacent each of the respective disc surfaces. It is common to refer to the completed assemblage of the spindle motor 106, discs 108 and spacers 168 as a "disc pack." The disc pack is shown in FIG. 3 to be at rest, so that the heads 118 are in contact with the corresponding texturized landing zones (120, as shown in FIG. 1).

To reduce the possibility of electrical discharge between the heads 118 and the discs 108, which could adversely damage the sensitive magneto-resistive read elements and thin-film write elements, design efforts are made to maintain the discs 108 and the heads 118 at substantially the same electrical potential and to drain away any accumulated electrical charge on these components. However, it has been found that a small amount of electrical charge will nevertheless be present on the discs 108 due to triboelectric effects as the discs 108 contactingly rotate under the heads 118 before head/disc separation, and that a detectable change in disc potential occurs once the rotational velocity of the discs 108 is sufficient to cause the heads 118 to take off.

Figure 4:
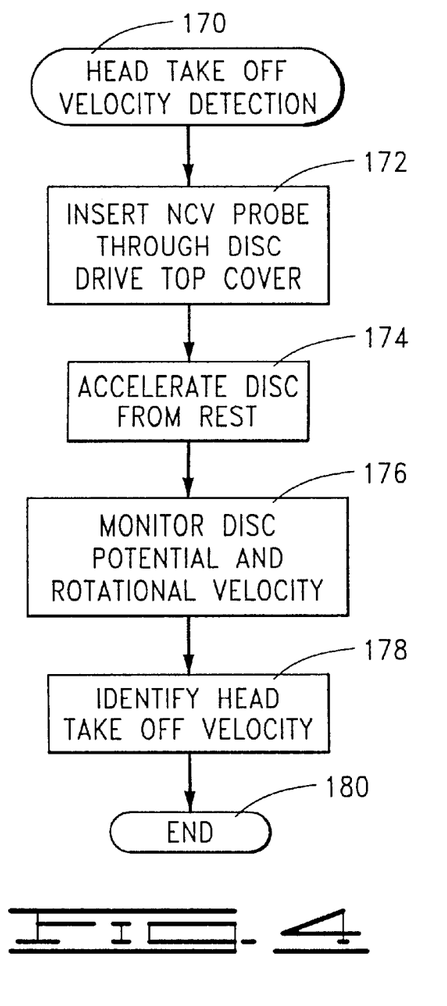
FIG. 4 is a flow chart for a HEAD TAKE OFF VELOCITY DETECTION routine, illustrative of steps carried out in accordance with preferred embodiments of the present invention.

Referring now to FIG. 4, shown therein is a flowchart for a HEAD TAKE OFF VELOCITY DETECTION routine 170, illustrative of steps carried out in accordance with preferred embodiments of the present invention to determine a velocity at which a selected head will no longer be aerodynamically supported and will touch down on the corresponding disc. It will be understood that the routine of FIG. 4 utilizes the probe 160 of FIG. 3 and incorporates suitable programming steps carried out by the host computer 140 (FIG. 2).

Before discussing the particular steps of the routine of FIG. 4, it will be noted that, when multiple discs 108 are used such as contemplated in FIG. 3, measurements of disc potential as obtained from the probe 160 will generally reflect a potential of the entire disc pack and not just the charge induced by triboelectric charging between the top disc and top head. It can further be seen that using multiple heads 118, as shown in FIG. 3, means that each head will individually contribute to the disc potential as measured by the probe 160.

Accordingly, it is contemplated that the routine of FIG. 4 can be used with a disc drive having a population of heads 118 to obtain a measure of an average take off velocity; alternatively, the disc drive 100 can be modified so as to only have a single head 118 in contact with a particular disc 108, in which case the individual flight characteristics of the single head 118 will be determined. The following discussion will primarily contemplate the latter situation, although the routine of FIG. 4 can be used for both. Finally, it will be understood that during the operation of FIG. 4, the actuator assembly 110 remains in the latched position so that the selected head 118 remains disposed over the corresponding landing zone 120, as shown in FIG. 1.

Beginning at step 172, the top cover 104 is configured as shown in FIG. 2 to provide the probe 160 in close proximity to the disc 108. Power is applied to the spindle motor 106 to accelerate the disc 108 from rest, step 174, and the disc potential and disc rotational velocity are monitored as the disc velocity increases sufficiently to cause the head 118 to separate from the disc 108 and thereafter remain aerodynamically supported over the disc, step 176.

The head take off velocity, which is a rotational velocity just sufficient to aerodynamically support the head (i.e., the velocity at which the head separates and begins to take flight) is thereafter identified at step 178 in relation to change in the disc potential, and the routine ends at step 180.

Figure 5:
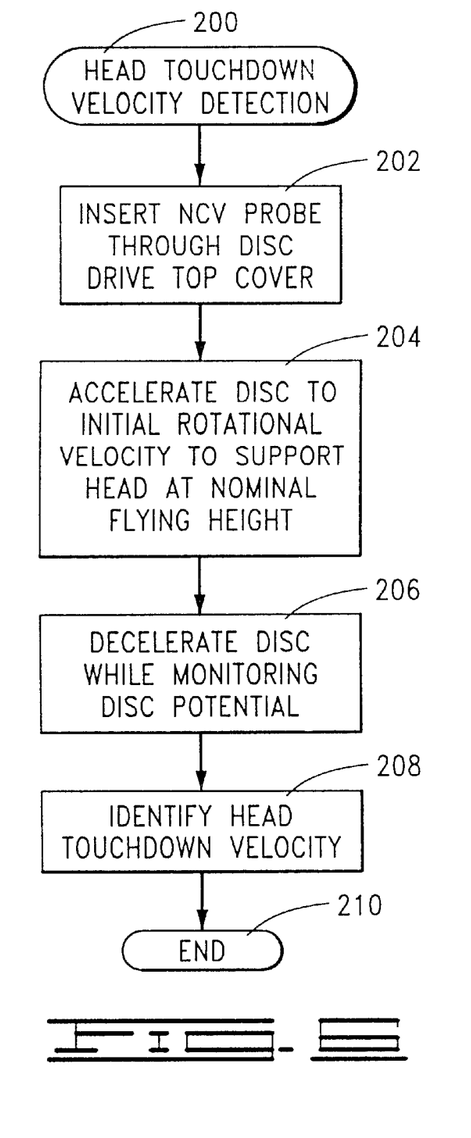
FIG. 5 provides graphical representations of disc acceleration and the point at which the head separates from the disc as indicated by a change in the disc potential.

FIG. 5 provides a graphical illustration of the operation of the routine of FIG. 4. In FIG. 5, both a disc rotational velocity curve 182 and a disc potential curve 184 are plotted against common x, y-axes 186, 188. While the disc potential curve 184 will likely exhibit some level of high frequency noise (including localized spikes), such has been omitted from FIG. 6 for clarity of illustration. Moreover, different disc drive configurations (including the use of glass discs instead of aluminum discs as well as different interconnection techniques) may result in a disc potential curve that provides somewhat different characteristics than those shown. Nevertheless, it is contemplated that the sensed disc potential will undergo a detectable change upon separation of the head 118 from the disc 108, and it is the detection and correlation of this change to which the present invention is directed.

Once the disc 108 reaches the take off velocity, as represented at point 190, the disc potential will undergo a corresponding change as the head 118 separates from the disc 108, such as the generally step-wise transition shown at 192. In one preferred embodiment, the general relationship between disc potential and head take off is empirically determined, allowing identification of the take off velocity 190 in relation to the subsequent time at which the disc reaches a steady state condition with the head supported thereover (as represented at point 194).

The velocity of the disc 108 can be monitored in a variety of ways. For example, the aforementioned data acquisition card in the host computer 140 can be configured to monitor the spindle motor 106 (such as through back electromotive force signals from the path 154 in FIG. 2), thereby obtaining a series of velocity measurements at a selected sampling frequency. Alternatively, data can be collected regarding the rate at which the disc 106 accelerates from rest when power is applied to the spindle motor 106 and, if sufficiently repeatable, can allow the take off velocity to be calculated in relation to the elapsed time from when the power is applied to the spindle motor 106 until the time of the change in disc potential. Other similar methodologies can be used as well, depending upon the requirements of a given application.

Referring now to FIG. 6, shown therein is a HEAD TOUCHDOWN VELOCITY DETECTION routine 200, illustrative of steps carried out in accordance with preferred embodiments to determine a touchdown velocity, that is, a velocity at which a selected head is no longer aerodynamically supported by the rotation of the disc 108. The routine of FIG. 6 is similar to the routine of FIG. 4 and it will be understood that the routine is performed with the selected head 118 disposed over the corresponding landing zone 120.

As before, a NCV probe (such as the probe 160) is brought into position at step 202, and the disc 108 is accelerated to initial rotational velocity sufficient to aerodynamically support the head 118 over the disc at a nominal flying height, step 204. Next, at step 206, the disc 108 is decelerated sufficiently to cause the head 118 to come into contact with the disc, while the disc potential is monitored. The head touchdown velocity is thereafter determined in relation to change in the disc potential at step 208, and the routine ends at 210.

Figure 7:
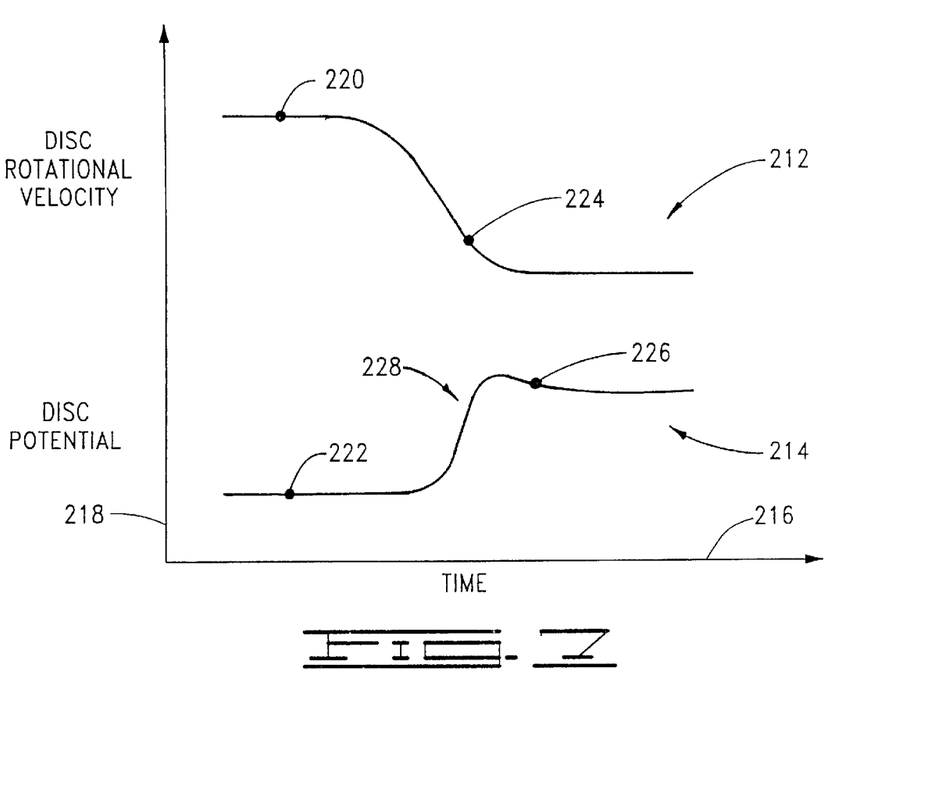
FIG. 7 is a graphical representation of disc deceleration and the point at which the head lands upon the disc as indicated by a change in the disc potential.

FIG. 7 provides a graphical representation to further illustrate the operation of the routine of FIG. 6. As before, FIG. 7 provides a disc rotational velocity curve 212 and a disc potential curve 214 plotted against common x, y-axes 216, 218.

As the disc 108 achieves the initial velocity sufficient to aerodynamically support the selected head 118, as shown at point 220, the disc will have a substantially steady state disc potential, as generally indicated at point 222. Thereafter, as the disc rotational velocity decreases, the flying height of the head 118 will decrease until the head touches down on the disc 108, indicated at point 224. As the head 118 approaches and thereafter remains in contact with the rotating disc, the disc potential will undergo a detectable change to a head contact level 226, as indicated by transition 228, and the touchdown velocity is accordingly determined therefrom. For example, the transition rate of the disc potential can be empirically characterized and used to calculate the value of the touchdown velocity based on the time at which the head contact level 226 is reached.

It will now be understood that the present invention as embodied herein presents an advantageous, substantially noninvasive-and easily implemented methodology for evaluating head flight characteristics. Although separate routines have been provided to determine head take off and touchdown velocities, it is contemplated that both will be performed in conjunction. Alternatively, since in many cases the head take off velocity will substantially equal the head touchdown velocity, it is further contemplated that the routine of FIG. 4 can be used to determine valid estimates for both take off and touchdown velocities.

Once the head takeoff and touch down velocities have been determined, the distance (such as in disc revolutions) that the head remains in contact with the disc before take off and after touchdown can be readily determined, such as through integration of the respective velocity profiles or through the use of a separate tachometer signal obtained from the motor. A separate optical encoder can also be used to count timing marks on the spindle motor to obtain distance information, but such an approach requires removal of the disc drive top cover.

Although the head will take off and touchdown at substantially the same velocity, the time that the head remains in contact with the disc before take off may be different from the time that the head remains in contact after touchdown, since acceleration and deceleration rates can differ. For example, a disc drive with a nominal operational disc velocity of 10,000 revolutions per minute (RPM) might have head take off and touchdown velocities of about 3,000 RPM, but it might take 30 revolutions before the heads take off and 60 revolutions after touchdown before the discs come to a stop. It has generally been observed that successive generations of sliders, while flying and operating with greater precision at higher disc operational rotational velocities, are generally taking longer to take off and land, resulting in greater lengths of time with the heads in contact with the rotating discs. Hence, it becomes increasingly important to be able to determine head take off and touchdown velocities to evaluate disc drive reliability performance.

In view of the foregoing, it will now be recognized that the present invention is directed to a method for evaluating flight characteristics of a head in a disc drive. In accordance with preferred embodiments, a methodology is presented to identify a head take off velocity, which is a velocity just sufficient to aerodynamically support a head 118 above a rotatable disc 108.

A non-contact voltmeter (NCV) probe is initially brought into close proximity to the disc to form an air gap therebetween, the probe sensing disc potential in relation to a quantity of electrical charge present on the disc (step 172). The disc is accelerated with the head initially remaining in contact with the disc (step 174), and the disc potential is monitored until a rotational velocity is achieved sufficient to cause the head to separate from the disc and remain aerodynamically supported over the disc (step 176).

The head take off velocity is thereafter determined in relation to change in the measured disc potential (step 178).

Further, a methodology is provided to determine a head touchdown velocity, which is a velocity at which the head is no longer aerodynamically supportable and comes into contact with the disc. As before, a NCV probe is brought into close proximity to the disc to sense disc potential in relation to a quantity of electrical charge present on the disc (step 202).

The disc is accelerated to an initial rotational velocity sufficient to aerodynamically support the head over the disc at a nominal flying height (step 204), after which the disc is decelerated sufficiently to cause the head to come into contact with the disc (step 206). The head touchdown velocity is identified in relation to a detected change in the disc potential (step 208).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive having a controllably positionable read/write head adjacent a rotatable recording disc, a method for evaluating flight characteristics of the head, comprising steps of:

(a) disposing a non-contact voltmeter probe in close proximity to the disc to form an air gap between the probe and the disc, the probe sensing disc potential in relation to a quantity of electrical charge present on the disc;

(b) initiating rotation of the disc while the head remains in contact with the disc;

(c) monitoring the disc potential as the disc is accelerated sufficiently to cause the head to separate from the disc; and (d) identifying a head take off velocity sufficient to cause head separation from change in the disc potential detected during the monitoring step (c).

2. The method of claim 1, wherein the monitoring step (c) further comprises monitoring rotational velocity of the disc as the disc is accelerated, and wherein the identifying step (d) comprises identifying the head take off velocity by correlating monitored disc potential with monitored rotational velocity.

3. The method of claim 1, further comprising an initial step of determining a characteristic rate of acceleration of the disc from rest to a selected rotational velocity sufficient to aerodynamically support the head versus elapsed time in response to application of power to a spindle motor used to rotate the disc, and wherein the take off velocity is determined in relation to elapsed time between the application of power to the spindle motor and the change in the disc potential.

4. The method of claim 1, wherein the disc drive has an enclosed housing in which the head and disc are disposed, and wherein the probe extends through an opening in the housing.

5. The method of claim 1, further comprising a step of:

(e) determining a head touchdown velocity at which the head comes into substantially continuous contact with the disc.

6. The method of claim 5, wherein the determining step (e) comprises monitoring rotational velocity of the disc as the disc is decelerated and identifying the head touchdown velocity by correlating monitored disc potential with monitored rotational velocity.

7. The method of claim 5, further comprising an initial step of determining a characteristic rate of deceleration of the disc from a selected rotational velocity sufficient to aerodynamically support the head to rest versus elapsed time in response to removal of power to a spindle motor used to rotate the disc, and wherein the touchdown velocity is determined in relation to elapsed time between the removal of power to the spindle motor and the change in the disc potential.

8. In a disc drive having a controllably positionable read/write head adjacent a rotatable recording disc, a method for evaluating flight characteristics of the head, comprising steps of:

(a) disposing a non-contact voltmeter probe in close proximity to the disc to form an air gap between the probe and the disc, the probe sensing disc potential in relation to a quantity of electrical charge present on the disc;

(b) accelerating the disc to an initial rotational velocity sufficient to aerodynamically support the head over the disc at a nominal flying height;

(c) decelerating the disc while monitoring the disc potential; and (d) identifying a head touchdown velocity at which the head comes into substantially continuous contact with the disc from change in the disc potential detected during the monitoring step (c).

9. The method of claim 8, wherein the decelerating step (c) further comprises monitoring rotational velocity of the disc, and wherein the identifying step (d) comprises identifying the head touchdown velocity by correlating monitored disc potential with monitored rotational velocity.

10. The method of claim 8, further comprising an initial step of determining a characteristic rate of deceleration of the disc from a selected rotational velocity sufficient to aerodynamically support the head to rest versus elapsed time in response to removal of power to a spindle motor used to rotate the disc, and wherein the touchdown velocity is determined in relation to elapsed time between the removal of power to the spindle motor and the change in the disc potential.

11. The method of claim 8, wherein the disc drive has an enclosed housing in which the head and disc are disposed, and wherein the probe extends through an opening in the housing.

12. The method of claim 8, further comprising a step of:

(e) determining a head take off velocity just sufficient to aerodynamically support the head by accelerating the disc to cause the head to separate from the disc and detecting a change in the disc potential.

13. The method of claim 12, wherein the determining step (e) further comprises monitoring rotational velocity of the disc as the disc is accelerated and identifying the head take off velocity by correlating monitored disc potential with monitored rotational velocity.

14. The method of claim 12, further comprising an initial step of determining a characteristic rate of acceleration of the disc from rest to the initial rotational velocity versus elapsed time in response to application of power to a spindle motor used to rotate the disc, and wherein the take off velocity is determined in relation to elapsed time between the application of power to the spindle motor and the change in the disc potential.

* * * * *